(12) United States Patent
Marcos et al.

(10) Patent No.: US 11,841,006 B2
(45) Date of Patent: Dec. 12, 2023

(54) ESTIMATING WIND DIRECTION INCIDENT ON A WIND TURBINE

(71) Applicant: VESTAS WIND SYSTEMS A/S, Aarhus N (DK)

(72) Inventors: Goncalo Lucas Marcos, Cascais (PT); Lars Glavind, Randers NV (DK); Johnny Nielsen, Svenstrup J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 28 days.

(21) Appl. No.: 17/529,073

(22) Filed: Nov. 17, 2021

(65) Prior Publication Data

US 2022/0154693 A1    May 19, 2022

(30) Foreign Application Priority Data

Nov. 17, 2020    (DK) ............................ PA 2020 70759

(51) Int. Cl.
| | |
|---|---|
| *F03D 7/04* | (2006.01) |
| *F03D 7/02* | (2006.01) |
| *G01P 13/02* | (2006.01) |

(52) U.S. Cl.
CPC ............ *F03D 7/046* (2013.01); *F03D 7/0204* (2013.01); *G01P 13/02* (2013.01); *F05B 2260/821* (2013.01); *F05B 2270/32* (2013.01); *F05B 2270/321* (2013.01); *F05B 2270/329* (2013.01); *F05B 2270/80* (2013.01)

(58) Field of Classification Search
None
See application file for complete search history.

(56) References Cited

U.S. PATENT DOCUMENTS

2019/0203698 A1    7/2019  Muller et al.
2020/0025174 A1*   1/2020  Landa ................... F03D 7/0296

FOREIGN PATENT DOCUMENTS

CN        111852769 A      10/2020
EP          2213873 A1 *    8/2010  ........... F03D 7/0204
(Continued)

OTHER PUBLICATIONS

Feng et al—A model-based predictive control for FTC for wind turbine wind speed sensor fault (Year: 2013).*
(Continued)

*Primary Examiner* — Juan G Flores
(74) *Attorney, Agent, or Firm* — Patterson + Sheridan, LLP

(57) ABSTRACT

Systems and methods for estimating a direction of wind incident on a wind turbine, the wind turbine comprising a tower; a rotor-nacelle-assembly (RNA) carried by the tower; a deflection sensor configured to sense a position of the RNA or a deflection of the tower; and a wind direction sensor. One approach includes: obtaining deflection training data from the deflection sensor; obtaining wind direction training data from the wind direction sensor; training a machine learning model on the basis of the deflection training data and the wind direction training data in order to obtain a trained machine learning model; obtaining further deflection data from the deflection sensor; inputting the further deflection data into the trained machine learning model; and operating the machine learning model to output a wind direction estimate on the basis of the further deflection data.

14 Claims, 6 Drawing Sheets

(56) References Cited

FOREIGN PATENT DOCUMENTS

| EP | 2213873 A1 | | 8/2010 |
|---|---|---|---|
| EP | 3730784 A1 | * | 10/2020 |
| EP | 3730784 A1 | | 10/2020 |
| KR | 101800217 B1 | | 11/2017 |

OTHER PUBLICATIONS

Danish Patent and Trademark Office, 1st Technical Examination including The Search Report and The Search Opinion for Application PA 2020 70759 dated Apr. 15, 2021.
European Patent Office, Extended European Search Report for Application 21208690.4-1007 dated Mar. 25, 2022.
Feng Xiaoran et al., "A model-based predictive control for FTC for wind turbine wind speed sensor fault," 2013 Conference on Control and Fault-Tolerant Systems (Systol), IEEE, dated Oct. 9, 2013, pp. 504-509.

* cited by examiner

ESTIMATING WIND DIRECTION INCIDENT ON A WIND TURBINE

FIELD OF THE INVENTION

The present invention relates to a method of estimating a direction of wind incident on a wind turbine, as well as to a wind turbine and to a computer program product.

BACKGROUND OF THE INVENTION

It is desirable to improve the accuracy and reliability of current wind direction measurements, and to create a backup system in case the primary method of determining wind direction develops a fault.

SUMMARY OF THE INVENTION

A first aspect of the invention provides a method of estimating a direction of wind incident on a wind turbine, the wind turbine comprising a tower; a rotor-nacelle-assembly (RNA) carried by the tower; a deflection sensor configured to sense a position of the RNA or a deflection of the tower; and a wind direction sensor; the method comprising: obtaining deflection training data from the deflection sensor; obtaining wind direction training data from the wind direction sensor; training a machine learning model on the basis of the deflection training data and the wind direction training data in order to obtain a trained machine learning model; obtaining further deflection data from the deflection sensor; inputting the further deflection data into the trained machine learning model; and operating the trained machine learning model to output a wind direction estimate on the basis of the further deflection data.

The method may further comprise controlling the wind turbine on the basis of the wind direction estimate.

Controlling the wind turbine on the basis of the wind direction estimate may comprise changing a yaw angle of the RNA on the basis of the wind direction estimate.

The yaw angle of the RNA may be changed to bring the RNA into the wind.

The method may further comprise: after obtaining the trained machine learning model, obtaining further wind direction data from the wind direction sensor; controlling the wind turbine on the basis of the further wind direction data; detecting a fault in the wind direction sensor; and controlling the wind turbine on the basis of the wind direction estimate in response to the detection of the fault.

The wind direction estimate may be a relative wind direction estimate, in a reference frame of the RNA.

The deflection sensor may be a Global Navigation Satellite System (GNSS) sensor configured to sense a position of the RNA.

The deflection training data and the further deflection data may be obtained by receiving GNSS data from the GNSS sensor, and transforming the GNSS data into a reference frame of the RNA.

The deflection training data and the further deflection data may be obtained by receiving GNSS data from the GNSS sensor, measuring a yaw angle of the RNA with a yaw sensor, determining a natural position of the GNSS sensor on the basis of the yaw angle, and determining a difference between the natural position and the GNSS data.

The method may further comprise: obtaining wind speed training data from a wind speed sensor; and training the machine learning model on the basis of the wind speed training data in order to obtain the trained machine learning model. Optionally the trained machine learning model may be operated to output a wind speed estimate on the basis of the further deflection data.

The method may further comprise: obtaining turbine training data; training the machine learning model on the basis of the turbine training data; obtaining further turbine data; inputting the further turbine data into the trained machine learning model, and operating the trained machine learning model to output the wind direction estimate on the basis of the further turbine data.

The turbine training data and the further turbine data may comprise one or more of: blade load data, yaw data indicating a yaw angle of the RNA, tower top speed data and tower top acceleration data.

A second aspect of the invention provides a wind turbine comprising a tower; a rotor-nacelle-assembly (RNA) carried by the tower; a deflection sensor configured to sense a position of the RNA or a deflection of the tower; a wind direction sensor; and a control system configured to perform the method of the first aspect.

A third aspect of the invention provides a computer program product comprising software code adapted to control a wind turbine when executed on a data processing system, the computer program product being adapted to perform the method of the first aspect.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
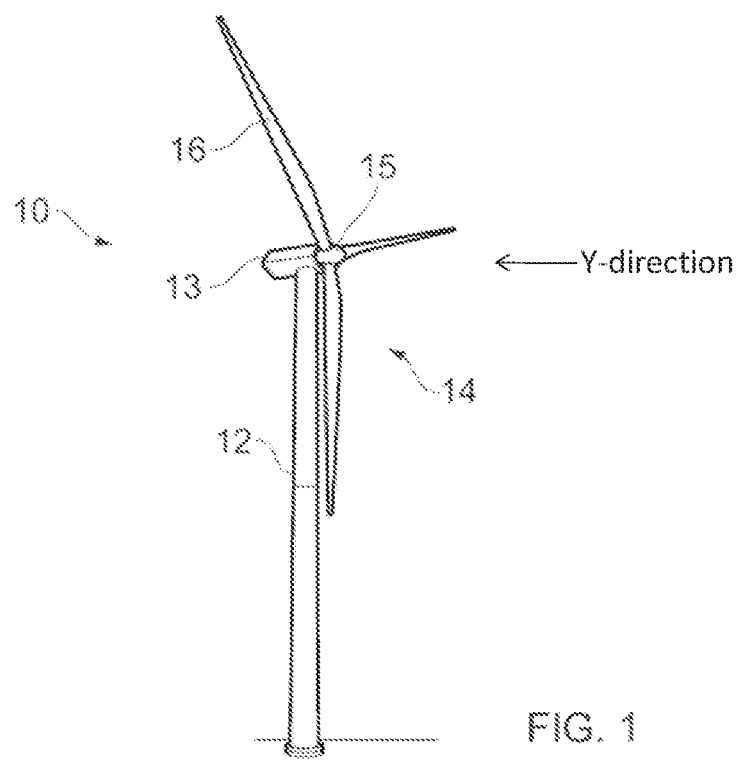
FIG. 1 schematically illustrates a wind turbine.

FIG. 1 illustrates, in a schematic perspective view, a wind turbine 10. The wind turbine 10 includes a tower 12, a nacelle 13 at the top of the tower, and a rotor 14 operatively coupled to a generator housed inside the nacelle 13. Together, the rotor 14 and the nacelle 13 are a rotor-nacelle-assembly (RNA). In addition to the generator, the nacelle houses miscellaneous components required for converting wind energy into electrical energy and various components needed to operate, control, and optimize the performance of the wind turbine 10. The rotor 14 of the wind turbine 10 includes a central hub 15 and a plurality of blades 16 that project outwardly from the central hub 15. In the illustrated embodiment, the rotor 14 includes three blades 16, but the number may vary.

The RNA 13, 14 can rotate relative to the tower about a vertical yaw axis to change a yaw angle of the RNA. The wind turbine may have a yaw control system (not shown) which rotates the RNA about the vertical yaw axis so that it has a desired yaw angle. For instance the yaw control system may be configured to rotate the RNA to bring the rotor 14 into the wind. The yaw control system may comprise a yaw sensor configured to measure a yaw angle of the RNA.

The wind turbine 10 may be included among a collection of other wind turbines belonging to a wind power plant, also referred to as a wind farm or wind park, that serve as a power generating plant connected by transmission lines with a power grid. The power grid generally consists of a network of power stations, transmission circuits, and substations coupled by a network of transmission lines that transmit the power to loads in the form of end users and other customers of electrical utilities.

Figure 2:
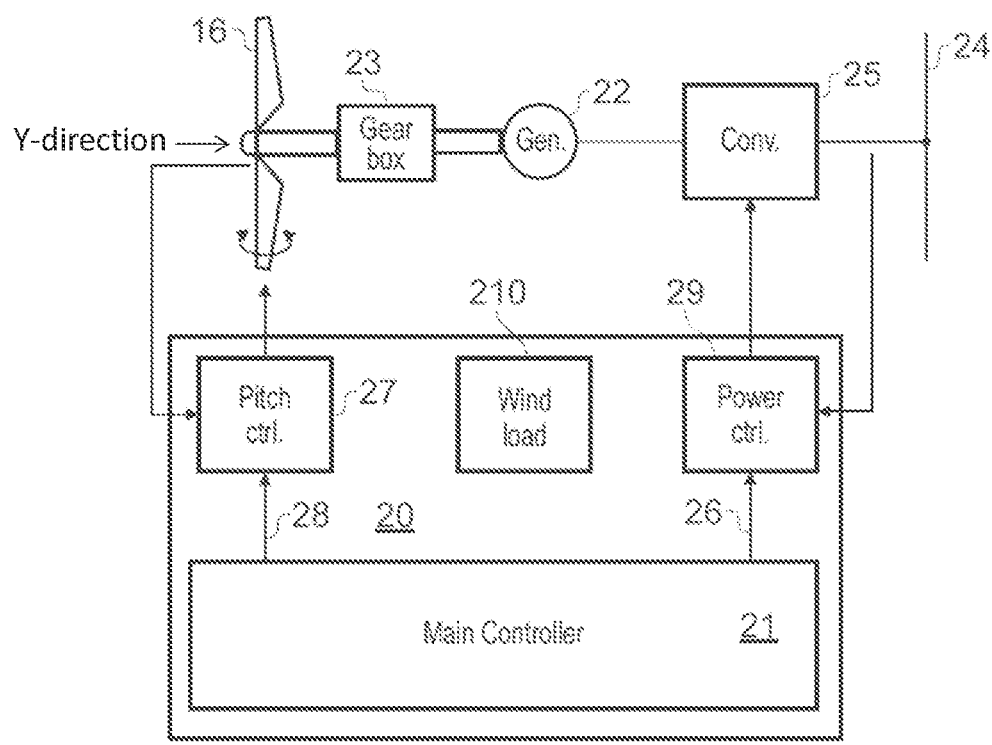
FIG. 2 schematically illustrates a control system for controlling the wind turbine.

FIG. 2 schematically illustrates an embodiment of a wind turbine control system 20 configured to control the wind turbine 10. The control system 20 may be placed inside the nacelle 13 and/or distributed at a number of locations inside the turbine. Optionally some, or all, elements of the control system 20 may be placed in a remote power plant controller (not shown).

The blades 16 are mechanically connected to an electrical generator 22 via a gearbox 23. In direct drive systems, and other systems, the gearbox 23 may not be present. The electrical power generated by the generator 22 is injected into a power grid 24 via an electrical converter 25. The electrical generator 22 and the converter 25 may be based on a full scale converter (FSC) architecture or a doubly fed induction generator (DFIG) architecture, but other types may be used.

The control system 20 comprises a number of elements, including at least one main controller 21. In general, the control system 20 ensures that in operation the wind turbine generates a requested power output level. This is obtained by adjusting the pitch angle of the blades 16 and/or the power extraction of the converter 25. To this end, the control system comprises a pitch system including a pitch controller 27 using a pitch reference 28, and a power system including a power controller 29 using a power reference 26. The rotor blades 16 can be pitched by a pitch mechanism. The rotor comprises an individual pitch system which is capable of individual pitching of the rotor blades, and may comprise a common pitch system which adjusts all pitch angles on all rotor blades at the same time. The control system 20 further comprises a wind load block 210, configured to determine a direction (and optionally magnitude) of a wind load acting on the wind turbine.

The main controller 21 comprises a data processing system, and a computer program product comprising software code adapted to control the wind turbine 10 when executed on the data processing system, the computer program product being adapted to control the wind turbine as described below.

Figure 3:
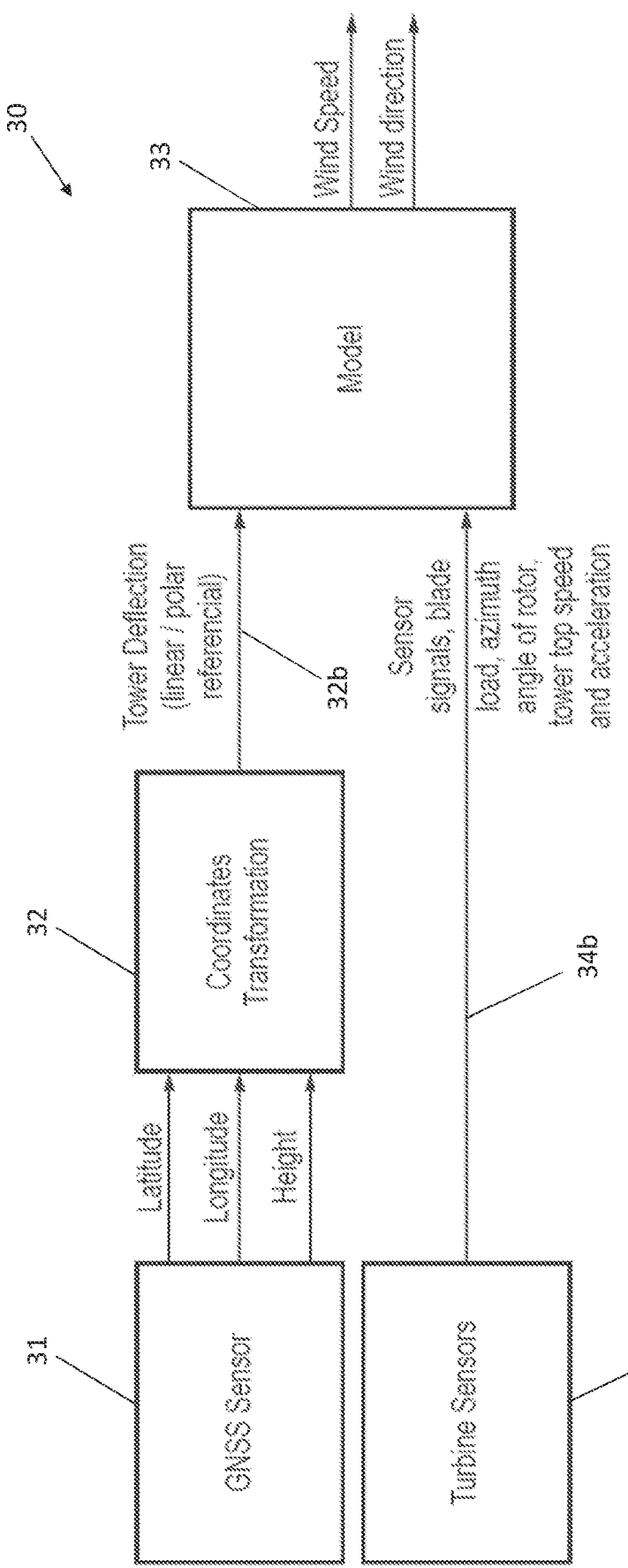
FIG. 3 schematically illustrates an operation phase of a machine learning model for use with the wind turbine.

FIG. 3 shows a flow diagram 30 showing a method of estimating a direction of wind incident on the wind turbine 10. A deflection sensor, in the form of a GNSS sensor 31, is configured to sense a position of the RNA 13, 14.

The GNSS sensor 31 is a position sensor that uses one or more Global Navigation Satellite Systems (such as GPS, Galileo, GLONASS, BeiDou) to determine its position. The GNSS sensor 31 can measure its position with cm accuracy to generate position data. The position data may be generated by the GNSS sensor as a set of GNSS coordinates, for example (longitude, latitude, height), (x, y, z) or (r, $\theta$, $\phi$).

The GNSS sensor 31 uses a constellation of satellites to determine its position. Optionally the GNSS sensor may enhance the precision of its position measurement using a terrestrial Real Time Kinematic (RTK) base module. This RTK module may be shared between a number of wind turbines in a wind park.

A GNSS measurement is obtained by the GNSS sensor 31. The GNSS sensor 31 may be mounted on the RNA. The sensed position may comprise GNSS coordinates, e.g. global longitude and latitude coordinates. The sensed RNA position may be indicative of a bend in the tower (if any) due to wind incident on the turbine.

The longitude, latitude and height of the RNA undergo a coordinate transformation 32 into a reference frame of the RNA. Specifically, the GNSS coordinates are transformed from longitude, latitude and height values to tower deflection values. These values may be linear X, Y coordinates or they may be polar coordinates in the reference frame of the RNA.

By way of example, the GNSS coordinates may be transformed into a rotating Cartesian reference frame with a positive Y-direction which is a horizontal direction pointing in a generally downwind direction as shown in FIGS. 1 and 2. Thus the Y-direction rotates as the yaw angle of the RNA rotates to bring it into the wind. The X-direction of the rotating Cartesian reference frame is a horizontal direction perpendicular to the Y-direction, i.e. a horizontal cross-wind direction. Thrust forces will cause the tower to bend back so the GNSS sensor 31 moves in the positive Y-direction. If the Y-direction is not precisely aligned with the wind, then the thrust forces will also cause the tower to bend sideways so the GNSS sensor 31 moves in the positive or negative X-direction (depending on the direction of misalignment).

By way of example, the coordinate transformation 32 may calculate the movement of the GNSS sensor 31 (and hence the deflection of the RNA and the top of the tower) with respect to its natural position, in the rotating Cartesian reference frame, to determine the magnitude and sign of tower deflection (Xd) in the crosswind X-direction and the magnitude and sign of tower deflection (Yd) in the downwind Y-direction.

If the GNSS sensor 31 is not precisely positioned on the yaw axis of the RNA, then the natural position of the GNSS sensor 31 will move due to the change in the yaw angle of the RNA. To account for this, the yaw control system may be calibrated based on measurements from the GNSS sensor 31 in low wind and no production. This means for every nacelle yaw angle measured by the yaw sensor, there is a corresponding expected natural position of the GNSS sensor 31. For instance if the RNA is pointing directly north and the wind is also coming directly from north, then the RNA will move back and forth in a north-south direction, and the GNSS sensor 31 will move back and forth in the north-south direction either side of its natural position, which is its average position for that yaw angle. It is then the average difference (Xd) between the expected x position (i.e. the natural x position based on the measured yaw angle) and the measured x position from the GNSS sensor 31 that is used to determine the transformed coordinates 32b.

The transformed coordinates 32b are input into a trained machine learning model 33. Also input into the trained machine learning model 33 is turbine data 34b obtained by wind turbine sensors 34. These parameters may include one or more of: blade load, azimuth angle of the rotor, tower top speed, tower top acceleration, yaw angle of the RNA, and any other sensor signals.

The trained machine learning model 33 processes these inputs and outputs a wind direction estimate and optionally a wind speed estimate.

The wind direction estimate output by the trained machine learning model 33 may be a relative wind direction estimate, in the rotating Cartesian reference frame defined above. For instance the wind direction estimate may indicate an angular misalignment of the wind with the positive or negative Y-direction (i.e. the Y-axis).

Figure 4:
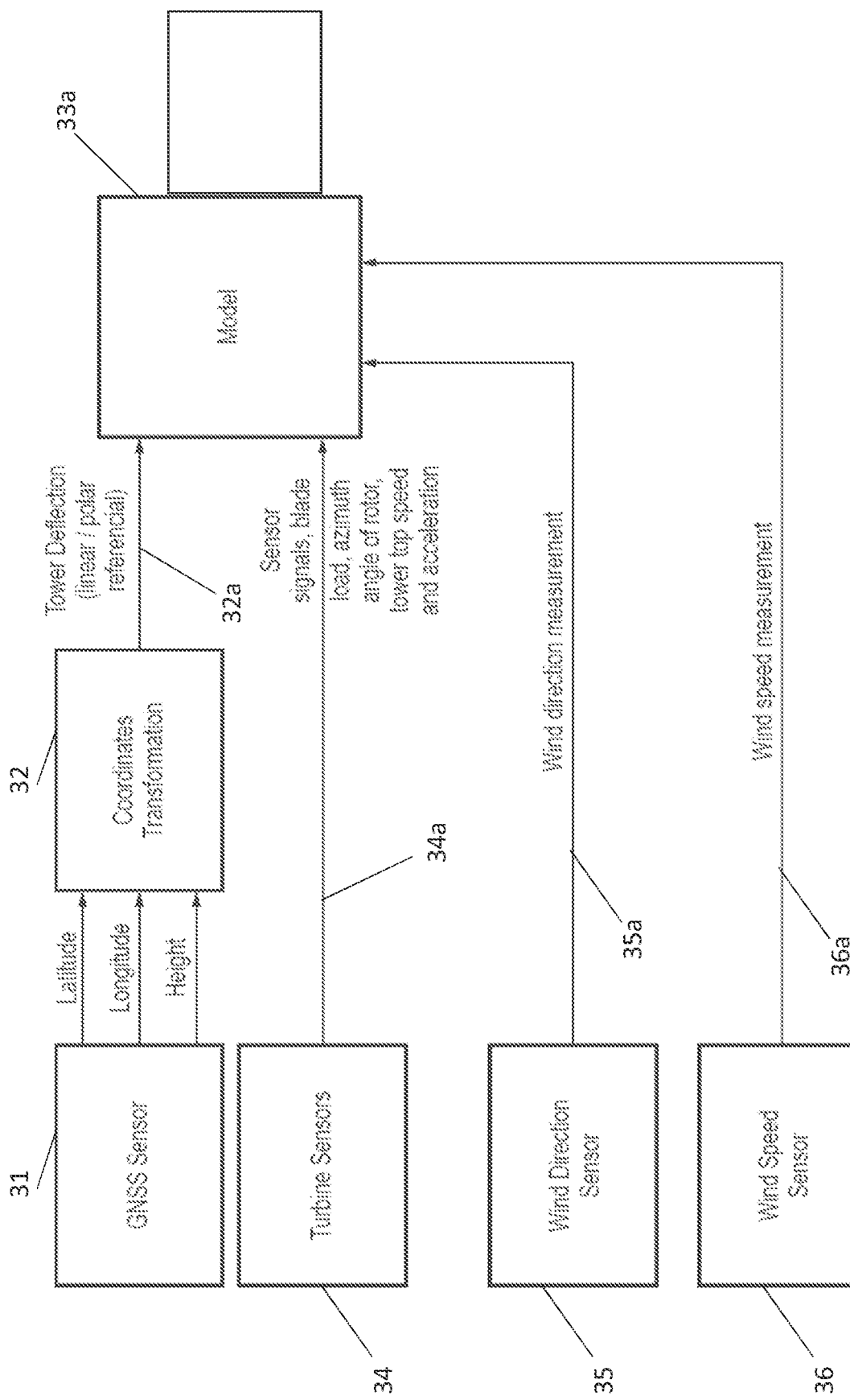
FIG. 4 schematically illustrates a training phase for training the machine learning model.

The trained machine learning model 33 of FIG. 3 is obtained by a training process shown in FIG. 4. The machine model shown in its trained state in FIG. 3, and in its untrained (or partially trained) state in FIG. 4. Therefore the machine model is referred to as a trained machine learning model 33 in the operating phase of FIG. 3, and a machine learning model 33a during the training phase of FIG. 4.

As shown in FIG. 4, the machine learning model 33a is trained on the basis of deflection training data 32a from the GNSS sensor 31, and wind direction training data 35a from a wind direction sensor 35. Optionally the machine learning model 33a is also trained on the basis of wind speed training data 36a from a wind speed sensor 36, and/or turbine training data 34a from the turbine sensors 34.

The machine learning model 33a is therefore trained by being arranged to receive inputs that it can expect to receive during normal operation, and associate these inputs with certain wind direction (and optionally wind speed) measurements.

After the machine learning model has been trained on the basis of training data 32a, 34a, 35a, 36a as shown in FIG. 4, further data is input into the trained machine learning model 33 in the operating phase of FIG. 3. That is, further deflection data 32b is obtained from the GNSS sensor 31; the further deflection data 32b is input into the trained machine learning model 33; and the trained machine learning model 33 is operated to output a wind direction estimate (and optionally also a wind speed estimate) on the basis of the further deflection data 32b.

If the GNSS sensor 31 is not precisely positioned on the yaw axis of the RNA, then both the deflection training data 32a and the further deflection data 32b may be obtained as described above: i.e. by receiving GNSS data from the GNSS sensor 31, measuring a yaw angle of the RNA with the yaw sensor, determining a natural position of the GNSS sensor 31 on the basis of the yaw angle, and determining a difference between the natural position and the GNSS data.

Optionally the operation phase of FIG. 3 further comprises obtaining further turbine data 34b; inputting the further turbine data 34b into the trained machine learning model 33, and operating the trained machine learning model 33 to output the wind direction estimate (and optionally also the wind speed estimate) on the basis of the further turbine data 34b.

The training of the machine learning model 33a may be based on the type of machine learning model used. In one embodiment, the machine learning model is based on a regression model (e.g. linear regression, quadratic regression, or other type of regression) where, in the training phase, weights are adjusted to minimize the cost function defining the error between the predicted value and the actual value. For example, the weights that minimizes for the linearized prediction expressing the wind direction 35a and/or wind speed 36a based on of the tower deflection 32a and the sensor signals 34a. Such weights may be obtained using a training phase implementing a gradient descent.

In another embodiment, the machine learning model is based on a neural network which couple an input layer defined by the tower deflection signal 32a and the sensor signals 34a, via a number of hidden layers, to an output layer which provides the wind direction 35a and/or wind speed 36a. The weights used in the neural network may be obtained using a training phase implementing a gradient descent.

Figure 5:
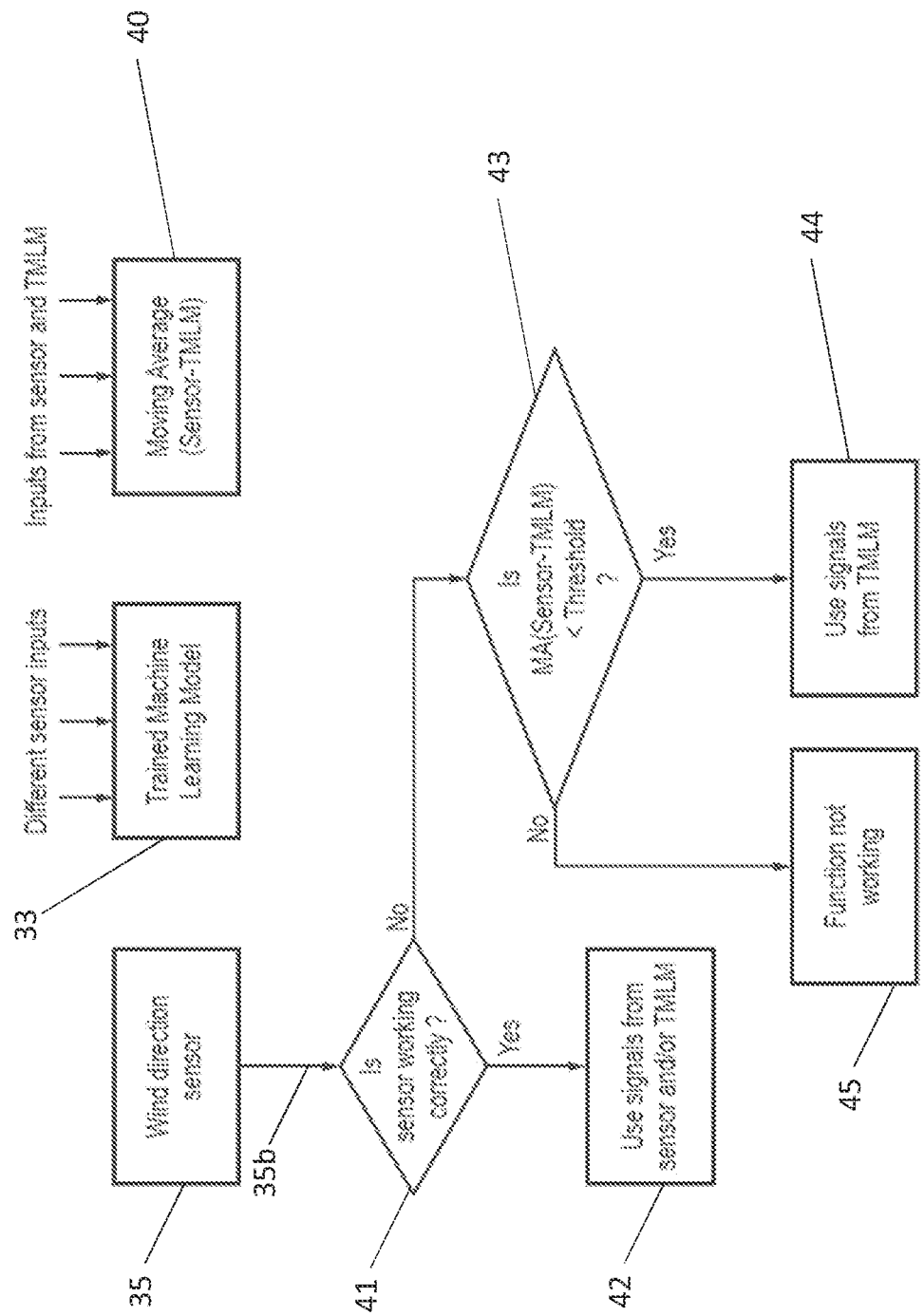
FIG. 5 illustrates a flow diagram for determining how to operate the wind turbine.

Referring now to FIG. 5, an algorithm for determining whether to use the wind direction sensor 35 or the trained machine learning model 33 (abbreviated to TMLM in the figure) is shown. It can also be seen that the trained machine learning model 33 receives a number of different sensor inputs, as discussed previously.

A moving average (MA) 40 between the outputs of the wind direction sensor 35 and the trained machine learning model 33 is calculated. This moving average typically covers a time period in the range of 100 to 3600 seconds, for example 1000 seconds. Alternative to a MA, a cumulative sum (CUSUM) may be used—such techniques will be readily understood by those skilled in the art.

After obtaining the trained machine learning model 33, further wind direction data 35b is obtained from the wind direction sensor 35, and a check 41 is made to see if the wind direction sensor 35 is working correctly. If it is found that the wind direction sensor 35 is working correctly, then the turbine operates in step 42 using the further wind direction data 35b from the wind direction sensor alone, or the wind direction sensor and the trained machine learning model.

By way of example, the yaw control system of the wind turbine may operate in step 42 to change the yaw angle of the RNA and bring the RNA in line with the wind. So if the further wind direction sensor data 35b indicates a positive misalignment with the wind direction, then the yaw control system may rotate the RNA in a negative direction by the appropriate amount to remove the positive misalignment; and if it indicates a negative misalignment with the wind direction, then the yaw control system may rotate the RNA in a positive direction by the appropriate amount to remove the negative misalignment.

If it is determined at step 41 that there is a fault in the wind direction sensor 35, then a check 43 is made to see whether the aforementioned moving average 40 is below a threshold.

In other words, the check 43 determines whether the trained machine learning model 33 is operating reliably and outputting values that are sufficiently close to the values output by the wind direction sensor 35—the use of a moving average 40 (or CUSUM) ensures that this check captures values from the wind direction sensor 35 that are on average correct, i.e. by incorporating values from before the sensor stops working correctly.

If the check 43 determines that the moving average (or CUSUM) is below the threshold, then the turbine operates using signals from the trained machine learning model 33 in step 44. As discussed above, the trained machine learning model 33 will output wind direction values based on a number of other inputs it receives.

Thus, in response to the detection of the fault in step 41 (and optionally after checking the reliability of the trained machine learning model 33 in step 43), in step 44 the wind turbine is controlled on the basis of the wind direction estimate from the trained machine learning model 33.

The yaw control system of the wind turbine may operate in step 44 to change the yaw angle of the RNA on the basis of the wind direction estimate from the trained machine learning model 33, and bring the RNA in line with the wind. So for example if the trained machine learning model 33 indicates a positive misalignment with the wind direction, then the yaw control system may rotate the RNA in a negative direction by the appropriate amount to remove the positive misalignment; and if it indicates a negative misalignment with the wind direction, then the yaw control system may rotate the RNA in a positive direction by the appropriate amount to remove the negative misalignment.

If on the other hand the check 43 determines that the moving average is above the threshold, then it is concluded that the function is not working, and so neither the wind direction sensor 35 nor the trained machine learning model 33 provide outputs that are used by the turbine. Instead, an alert may be generated indicating that an engineer needs to visit the turbine and address any issues with the wind direction sensor.

Over the lifetime of the turbine, sensors can suddenly fail, thus leading into a state in which energy production is lost. The wind turbine will remain in such state until the sensor is repaired or replaced, unless a redundancy solution (like the one shown in FIG. 5) allows the switching from different signal sources, ensuring production continuity.

The trained machine learning model 33 may also improve the estimation of wind direction for low wind speed cases, where other methods do not perform as accurately.

Figure 6:
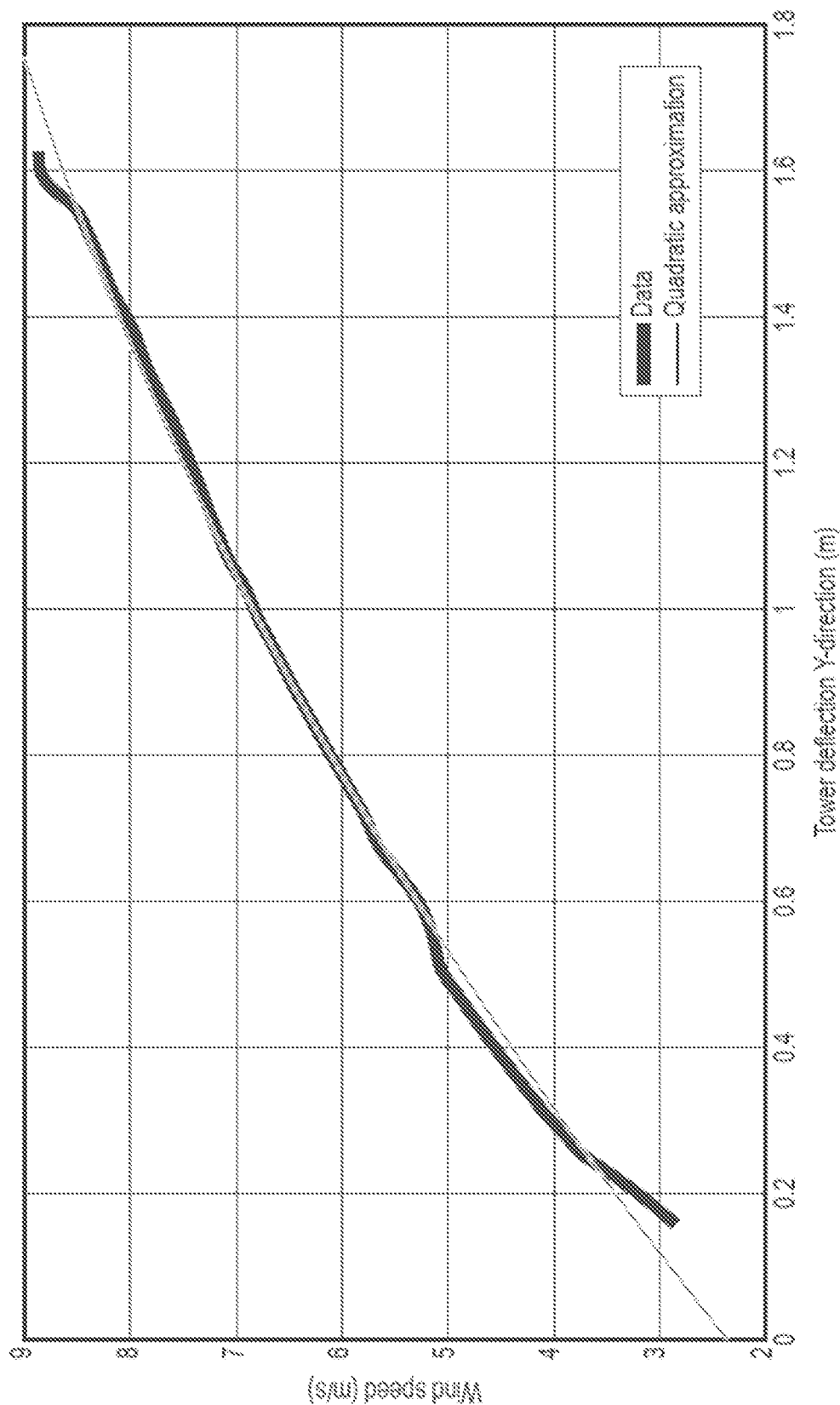
FIG. 6 shows a graph showing the relationship between wind speed and tower deflection in the Y-direction.

FIG. 6 shows a graph of wind speed versus the amount of tower deflection in the downwind Y-direction. It can be seen that as wind speed increases, the Y-direction tower deflection also increases, with the data following a quadratic approximation.

Figure 7:
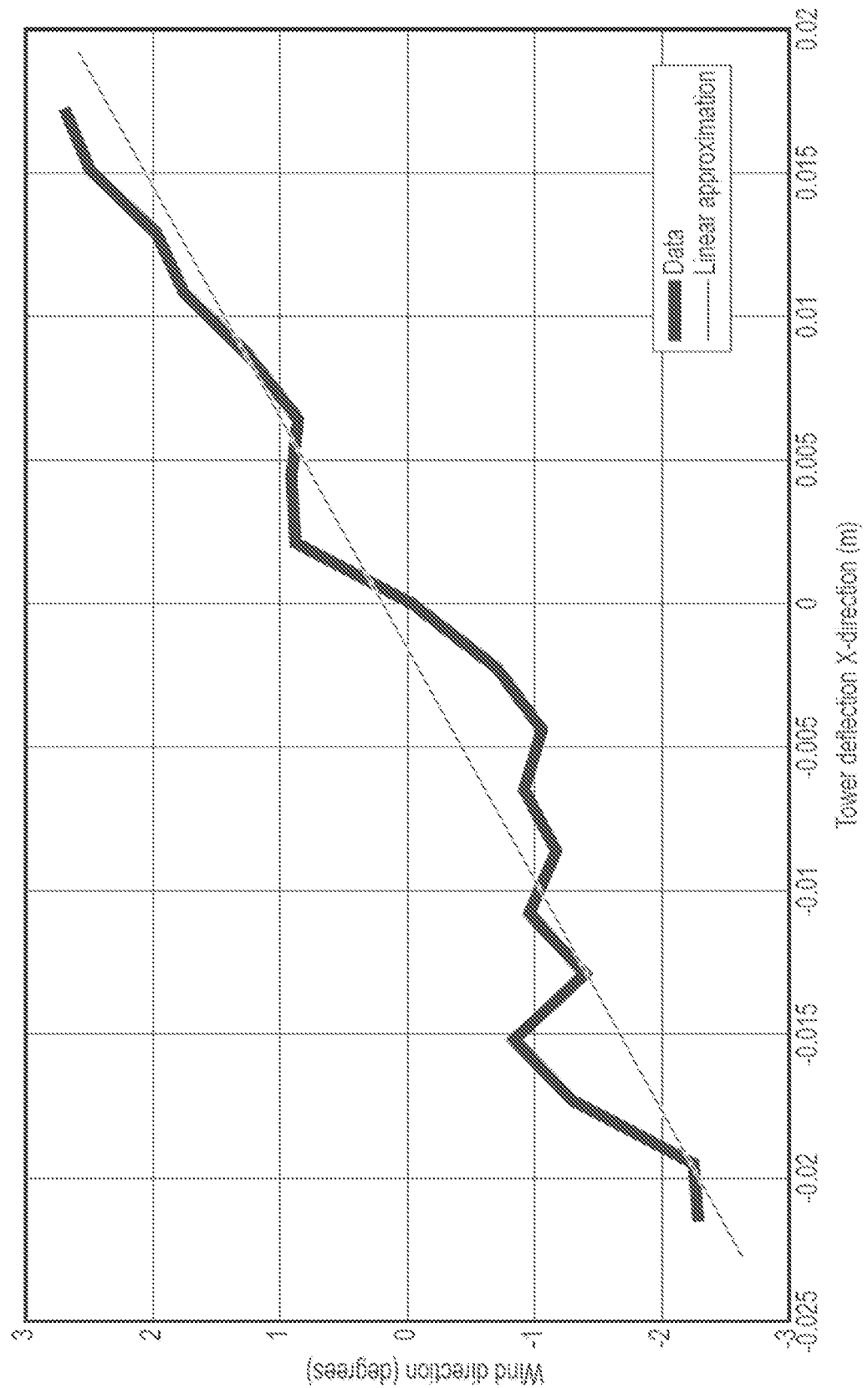
FIG. 7 shows a graph showing the relationship between wind direction and tower deflection in the X-direction.

FIG. 7 shows a graph of wind direction (i.e. the angle of the wind relative to the Y-direction as measured by the wind direction sensor 35) versus the amount of sideways tower deflection in the crosswind X-direction. It can be seen that the X-direction tower deflection changes approximately linearly according to the wind direction. When the wind direction is +2° then the GNSS sensor 31 moves by about 0.013 m in the positive X-direction, and when the wind direction is −2° then the GNSS sensor 31 moves in the negative X-direction by about 0.02 m.

Note that the sideways deflection of the tower may not respond predictably or symmetrically. For instance, the amount of sideways deflection caused by a negative angular misalignment may not be the same as the amount of sideways deflection caused by a positive angular misalignment. Also, there may be some sideways deflection even when the wind direction is 0°. These asymmetrical behaviours may be due to the effect of the rotating blades. As shown in FIG. 7, the sideways deflection of the tower follows a generally linear trend, but with a significant amount of deviation from the straight line. The trained machine learning model 33 may enable such asymmetrical and unpredictable tower deflection in the X-direction to be used to estimate the wind direction more accurately than other methods.

In the example above, a Global Navigation Satellite System (GNSS) sensor 31 is used to sense a position of the RNA, and provides one of the inputs into the machine learning model. In this case, sensing the position of the GNSS sensor 31 provides an indication of a position of the RNA, which in turn indicates a deflection of the tower. In this example the GNSS sensor 31 is mounted on the RNA, although in other examples it may be mounted at the top of the tower close to the RNA, or at any other suitable location.

In alternative examples, other types of deflection sensor may be used to directly or indirectly sense a position of the RNA or a deflection of the tower, and provide the inputs into the machine learning model. For example, accelerometers or inclinometers in the nacelle may be used, or strain gauges in the tower.

Where there are a plurality of wind turbines, the aforementioned method is typically applied to each wind turbine individually.

Although the invention has been described above with reference to one or more preferred embodiments, it will be appreciated that various changes or modifications may be made without departing from the scope of the invention as defined in the appended claims.

The invention claimed is:

1. A method of estimating a direction of wind incident on a wind turbine, the wind turbine comprising a tower; a rotor-nacelle-assembly (RNA) carried by the tower; a Global Navigation Satellite System (GNSS) sensor coupled to the RNA; and a wind direction sensor; the method comprising:
   obtaining deflection training data from the GNSS sensor;
   obtaining wind direction training data from the wind direction sensor;
   training a machine learning model on the basis of the deflection training data and the wind direction training data in order to obtain a trained machine learning model;
   obtaining global longitude and latitude coordinates from the GNSS sensor;
   transforming the global longitude and latitude coordinates into a reference frame of the RNA;
   inputting the transformed global longitude and latitude coordinates into the trained machine learning model;
   using the trained machine learning model to output a wind direction estimate on the basis of the transformed global longitude and latitude coordinates; and
   changing a yaw angle of the RNA based on the wind direction estimate.

2. The method of claim 1, wherein the yaw angle of the RNA is changed to bring the RNA into the wind.

3. The method of claim 1, further comprising:
   after obtaining the trained machine learning model, obtaining further wind direction data from the wind direction sensor;
   controlling the wind turbine on the basis of the further wind direction data; detecting a fault in the wind direction sensor; and
   controlling the wind turbine on the basis of the wind direction estimate in response to the detection of the fault.

4. The method of claim 1, wherein the wind direction estimate is a relative wind direction estimate, in the reference frame of the RNA.

5. The method of claim 1, wherein transforming the global longitude and latitude coordinates comprises measuring the yaw angle of the RNA with a yaw sensor sensor, determining a natural position of the GNSS sensor on the basis of the yaw angle, and determining a difference between the natural position and the global longitude and latitude coordinates.

6. The method of claim 1, further comprising obtaining wind speed training data from a wind speed sensor, wherein training the machine learning model is further on the basis of the wind speed training data.

7. The method of claim 6, further comprising using the trained machine learning model to output a wind speed estimate.

8. The method of claim 1, further comprising obtaining turbine training data, wherein training the machine learning model is further on the basis of the turbine training data.

9. The method of claim 8, further comprising:
   obtaining further turbine data;
   inputting the further turbine data into the trained machine learning model; and
   operating the trained machine learning model to output the wind direction estimate on the basis of the further turbine data.

10. The method of claim 9, wherein at least one of the turbine training data or the further turbine data comprise one or more of: blade load data, yaw data indicating the yaw angle of the RNA, tower top speed data and tower top acceleration data.

11. A wind turbine, comprising:
a tower;
a rotor-nacelle-assembly (RNA) carried by the tower;
a Global Navigation Satellite System (GNSS) sensor configured to sense a position of the RNA or a deflection of the tower;
a wind direction sensor; and
a control system configured to perform an operation estimating a direction of wind incident on the wind turbine, the operation comprising:
  obtaining deflection training data from the GNSS sensor;
  obtaining wind direction training data from the wind direction sensor;
  training a machine learning model on the basis of the deflection training data and the wind direction training data in order to obtain a trained machine learning model;
  obtaining global longitude and latitude coordinates from the GNSS sensor;
  transforming the global longitude and latitude coordinates into a reference frame of the RNA;
  inputting the transformed global longitude and latitude coordinates into the trained machine learning model; and
  using the trained machine learning model to output a wind direction estimate on the basis of the transformed global longitude and latitude coordinates.

12. The wind turbine of claim 11, wherein the operation further comprises controlling the wind turbine on the basis of the wind direction estimate.

13. The wind turbine of claim 12, wherein controlling the wind turbine on the basis of the wind direction estimate comprises changing a yaw angle of the RNA on the basis of the wind direction estimate.

14. A computer program product comprising software code adapted to control a wind turbine when executed on a data processing system, the computer program product being adapted to perform an operation estimating a direction of wind incident on the wind turbine; the wind turbine comprising a tower; a rotor-nacelle-assembly (RNA) carried by the tower; a Global Navigation Satellite System (GNSS) sensor configured to sense a position of the RNA or a deflection of the tower; and a wind direction sensor; the operation comprising:
  obtaining deflection training data from the GNSS sensor;
  obtaining wind direction training data from the wind direction sensor;
  training a machine learning model on the basis of the deflection training data and the wind direction training data in order to obtain a trained machine learning model;
  obtaining global longitude and latitude coordinates from the GNSS sensor;
  transforming the global longitude and latitude coordinates into a reference frame of the RNA;
  inputting the transformed global longitude and latitude coordinates into the trained machine learning model;
  using the trained machine learning model to output a wind direction estimate on the basis of the transformed global longitude and latitude coordinates; and
  changing a yaw angle of the RNA based on the wind direction estimate.

* * * * *